G. P. SALISBURY.
CLUTCH.
APPLICATION FILED NOV. 30, 1909.
992,451.
Patented May 16, 1911.
2 SHEETS—SHEET 1.
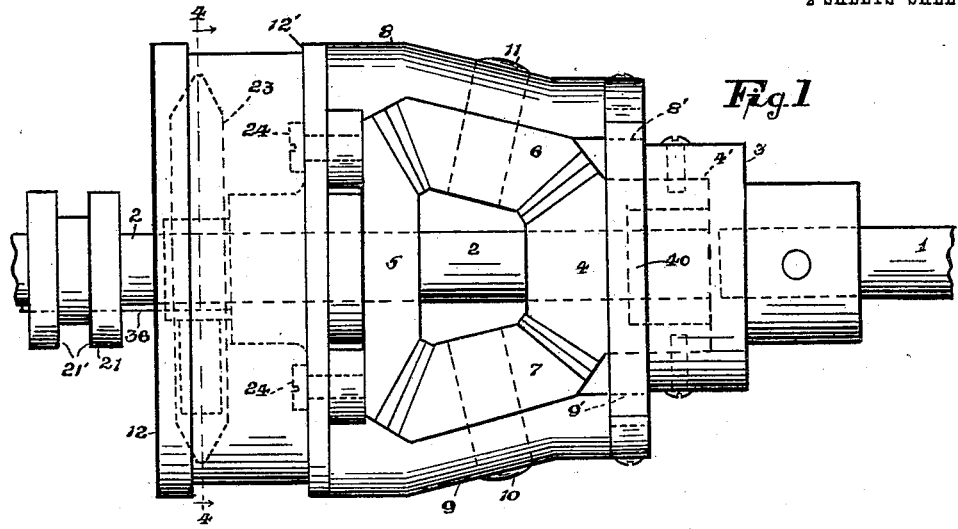
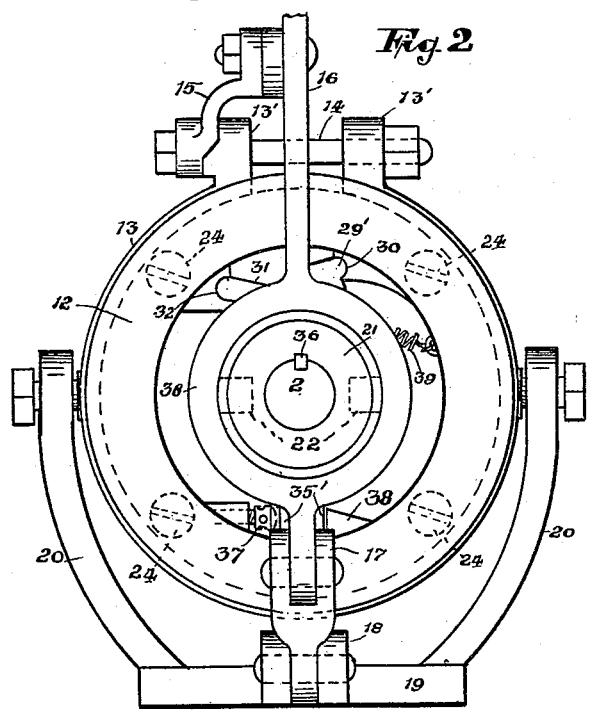
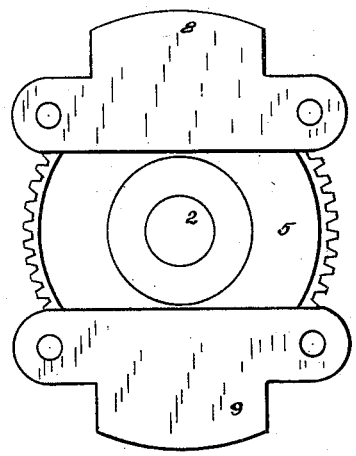
WITNESSES
INVENTOR
George P. Salisbury.
BY
his ATTORNEY

G. P. SALISBURY.
CLUTCH.
APPLICATION FILED NOV. 30, 1909.

992,451.

Patented May 16, 1911.

2 SHEETS—SHEET 2.

WITNESSES
Wm H Gardner
Geo M Finn

INVENTOR
George P. Salisbury.
BY Geo. D. Phillips.
his ATTORNEY

THE NORRIS PETERS CO., WASHINGTON, D. C.

UNITED STATES PATENT OFFICE.

GEORGE P. SALISBURY, OF NEW HAVEN, CONNECTICUT, ASSIGNOR OF ONE-HALF TO FRANCIS H. SIMMONS, OF NEW HAVEN, CONNECTICUT.

CLUTCH.

992,451.  Specification of Letters Patent.  Patented May 16, 1911.

Application filed November 30, 1909. Serial No. 530,643.

*To all whom it may concern:*

Be it known that I, GEORGE P. SALISBURY, a citizen of the United States, and a resident of New Haven, in the county of New Haven and State of Connecticut, have invented certain new and useful Improvements in Clutches, of which the following is a specification.

My invention relates to driving and reversing mechanism, and it consists in certain details of construction set forth in the following specification.

Figure 4:
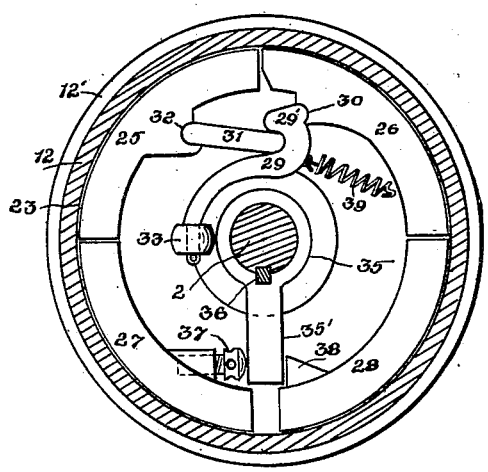
Figure 5:
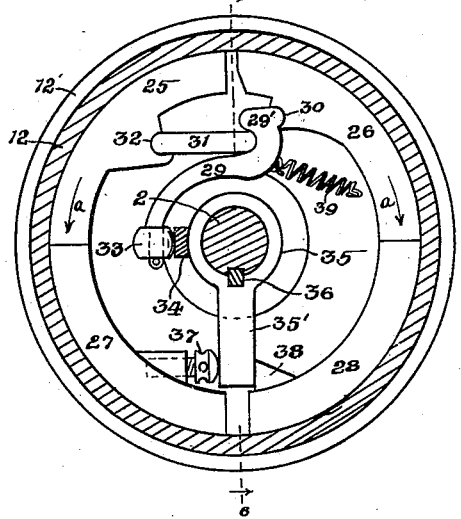
Figure 6:
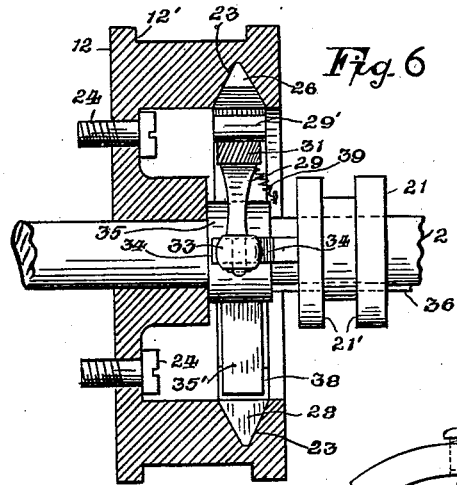
Figure 7:
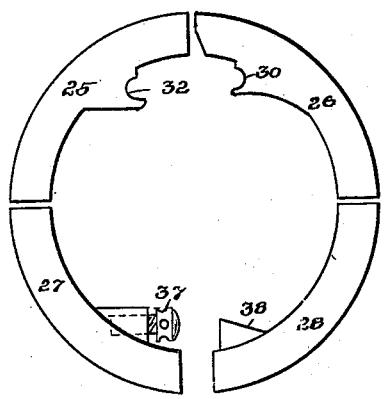
Figure 8:
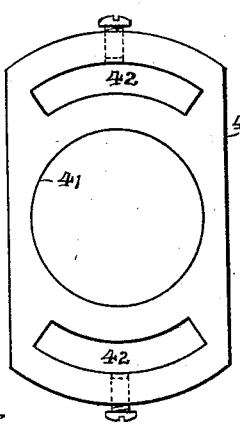

Referring to the drawings, Figure 1 represents a side elevation of the device with the brake band and its actuating mechanism removed, also broken view of the driving shaft and power transmitting shaft; Fig. 2 is a front end elevation of the device and brake actuating and shipping mechanism and broken view of the shipping lever; Fig. 3 is an end elevation of the gear supporting arms and one of the gears; Fig. 4 is a sectional view of the friction ring of the frame construction on line 4 of Fig. 1, showing the position of the friction segments and mechanism for controlling the same in a neutral position; Fig. 5 is also a section on line 4 of Fig. 1, showing the position of the friction segments and their actuating mechanism when brought into engagement with the friction ring; Fig. 6 is a sectional view on line 6 of Fig. 5 and broken view of the power transmission shaft; Fig. 7 is a detail side elevation of the friction segments; and Fig. 8 is a detail view of the yoke for tying the free ends of the gear supporting arms together.

The device is applicable for many purposes for driving and reversing, and when used in boats the power shaft 1 would be the engine shaft, and the power transmitting shaft 2 the propeller shaft. The shaft 1 is secured to the coupling 3, which, in turn, is secured to the hub of the bevel gear 4. To reduce the weight and simplify the construction, I have dispensed with the usual barrel-like formation inclosing the transmission gears 4, 5, 6 and 7, and employ instead the arms 8 and 9 carrying the pins 10 and 11 on which pins the bevel gears 6 and 7 are journaled, while the bevel gears 4 and 5 are mounted on the shaft 2.

The friction ring 12—which is part of the frame of the device—has the groove 12' for the brake band 13 having the ears 13' carrying the tightening bolt 14, on which bolt is mounted one end of the cam lever 15 while the other end of said lever is pivoted to the shipping lever 16. The lower end of this shipping lever is pivotally connected to the link 17, which link, in turn, is pivotally supported in the ears 18 of the base 19, the whole structure being supported on the arms 20 whose upper ends are connected with the brake band. The shipping lever 16 embraces the sliding collar 21 on shaft 2 whose groove 21' receives the pins or rollers 22 of said lever. The brake band and the mechanism just described for operating the brake band form no part of my present invention.

The ring 12 has the internal V-shaped groove 23 and is removably secured to the arms 8 and 9 by means of the screws 24 both for the purpose of securing a light construction and as a means of assembling the different parts, for it is absolutely essential that the gears be first placed in position before the ring 12 is attached to the arms. In this V-shaped groove of the ring 12 are placed the V-shaped friction segments 25, 26, 27 and 28.

29 is a fulcrum lever whose curved head 29' is located in the curved seat 30 of the segment 26, while the brace 31 is interposed between said lever and the curved seat 32 of the segment 25. 33 is a roll on the end of said lever adapted to be engaged by the tapered finger 34 of the grooved collar 21 for the purpose presently to be more fully explained.

35 is a driver secured to the shaft 2 by the key 36, the tail-piece 35' of which is located between the adjusting screw 37 of the segment 27 and the projection or stop 38 of the segment 28.

When running forward, or, in other words, when the shafts 1 and 2 are required to run in the same direction, the shipping lever is moved toward the ring 12, both to release the grip of the brake band and to advance the collar 21 to bring its tapered finger 34 between the roll 33 and the head of the driver 35 as shown at Figs. 5 and 6, which movement of said lever will actuate the fulcrum lever 29 and brace 31 and throw the segments 25 and 26 outward and forcibly against the V-shaped groove in the ring 12. This outward movement of said segments will also cause a resultant downward movement of the segments, as indicated by arrows

*a*, to contact with the ends of the segments 27 and 28 and bring the stop 38 and screw 37 in forcible engagement with the tail-piece 35' of the driver 35, which engagement will also force the segments 27 and 28 outward in frictional contact with the V-shaped groove 23 of said ring 12. This will lock the shaft 2 with the continuously running shaft 1 and cause them both to turn in the same direction.

Subdividing the outwardly expanding frictional gripping device into a plurality of segments will insure a firm contact of the entire periphery of these segments with the groove of the ring 12 and by making the frictional surfaces V-shaped a firmer grip and a quicker release is effected. Increasing or decreasing the friction is regulated by the adjusting screw 37. Reversing the shipping lever will withdraw the finger 34 and loosen the grip of the segments and cause the brake band 13 to grip the ring 12 and hold said ring and the arms 8 and 9 stationary so as to transmit the power of shaft 1 through the gears to reverse the shaft 2. The spring 39 will secure a quick return of the fulcrum lever 29 and thus enhance the release of the segments.

40 (Figs. 1 and 8) is a yoke having the central opening 41 adapted to embrace the hub 4' of the gear 4, and the curved opening 42 adapted to receive the projecting ends 8' and 9' of the arms and thus tie the ends of said arms together.

As before observed, subdividing the outward expanding frictional gripping device into a plurality of V-shaped segments will insure a firmer contact and quicker release than a single expanding ring; and while I show four segments it will be understood that this number may be reduced or increased so long as the proper gripping efficiency is not impaired.

Having thus described my invention, what I claim is:—

In a clutch of the character described, the combination with a rotatable shaft, a ring embracing said shaft and having an internal V-shaped groove, V-shaped friction segments for said groove, an adjusting screw on one segment, a projection or stop on another segment, a driver rigidly secured to the shaft and having a tail-piece located between said screw and stop, a fulcrum lever and brace located between another pair of segments, and adjustable means on the shaft for actuating the lever to bring all of the segments into frictional engagement with the V-shaped groove and under the influence of the driver.

Signed at New Haven in the county of New Haven and State of Connecticut this fifteenth day of November A. D. 1909.

GEORGE P. SALISBURY.

Witnesses:
PHELPS MONTGOMERY,
ALBERT H. BARCLAY.

---

Copies of this patent may be obtained for five cents each, by addressing the "Commissioner of Patents, Washington, D. C."